Aug. 23, 1955 C. A. ELLIS 2,715,852
EYE TESTING INSTRUMENTS
Filed July 12, 1950 6 Sheets-Sheet 1

INVENTOR
CHARLES A. ELLIS
BY
Louis L. Gagner
ATTORNEY

Aug. 23, 1955     C. A. ELLIS     2,715,852
EYE TESTING INSTRUMENTS

Filed July 12, 1950     6 Sheets—Sheet 2

INVENTOR
CHARLES A. ELLIS
BY
Louis L. Gagnon
ATTORNEY

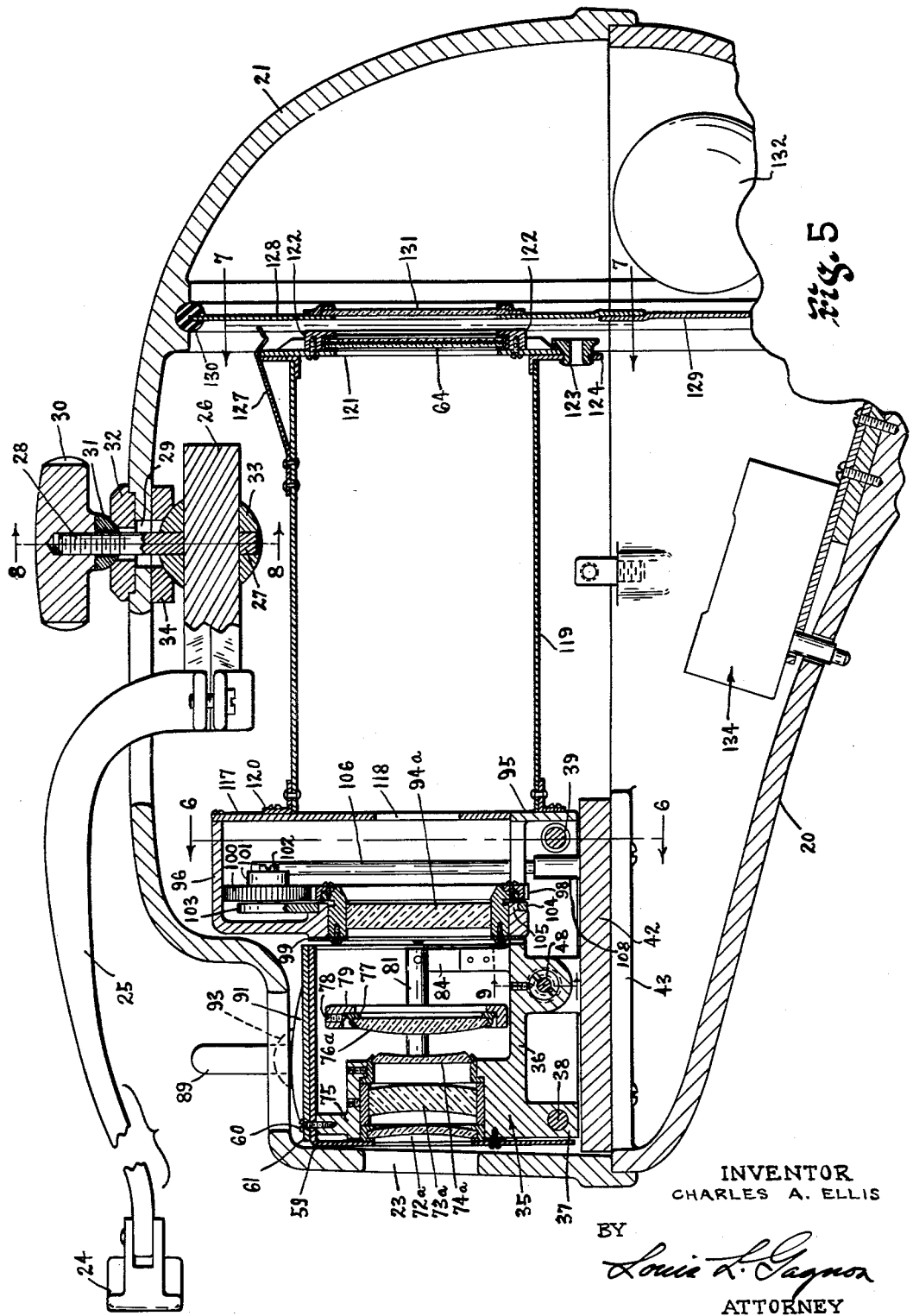

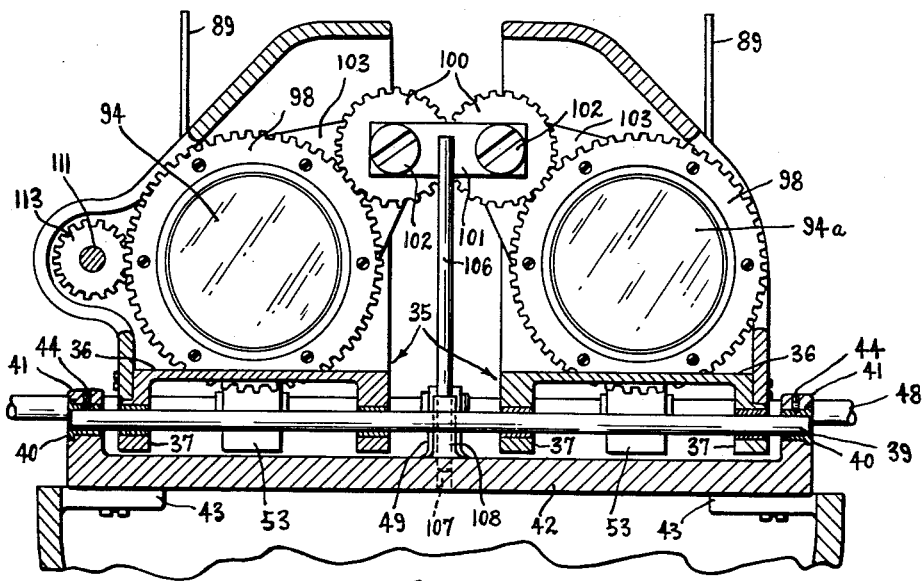
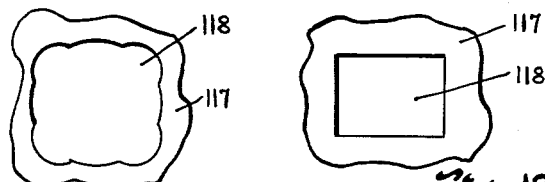
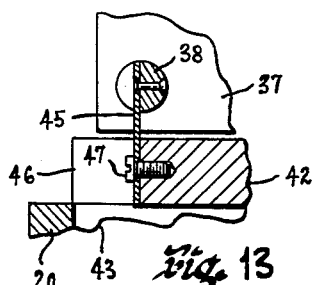
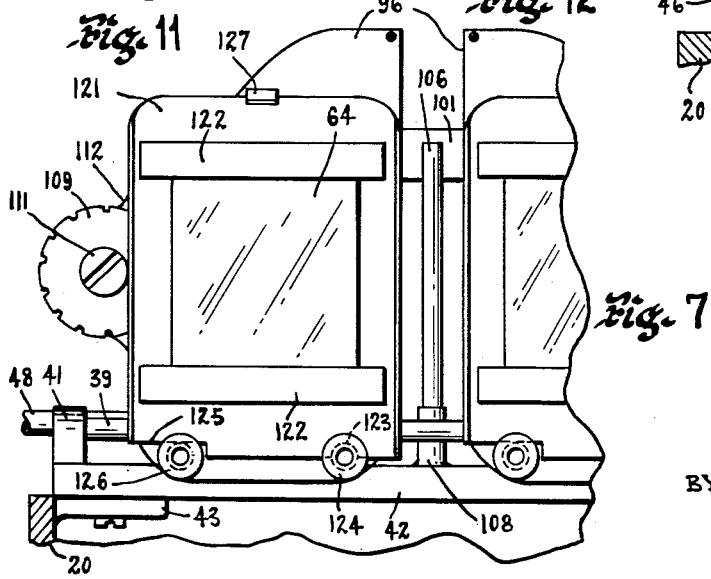

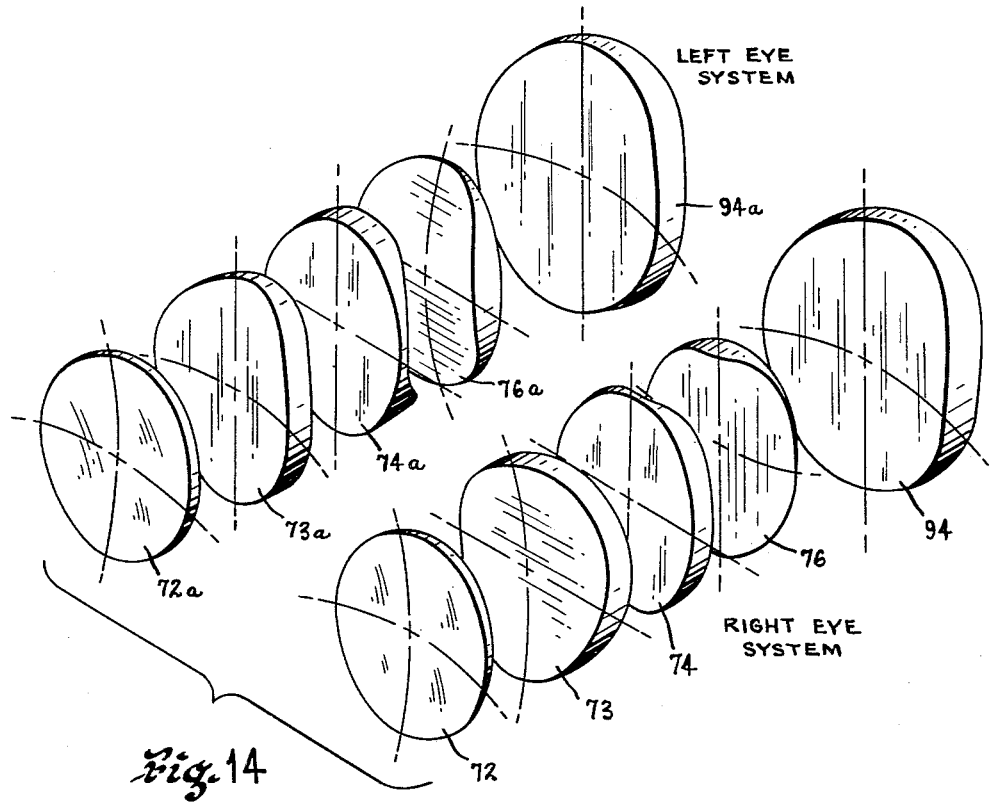
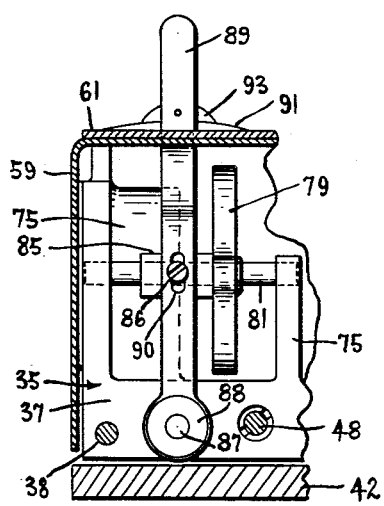

Aug. 23, 1955     C. A. ELLIS     2,715,852
EYE TESTING INSTRUMENTS

Filed July 12, 1950     6 Sheets-Sheet 6

INVENTOR
CHARLES A. ELLIS
BY
Louis L. Gagnon
ATTORNEY

United States Patent Office 2,715,852
Patented Aug. 23, 1955

2,715,852

EYE TESTING INSTRUMENTS

Charles A. Ellis, Southbridge, Mass., assignor to American Optical Company, Southbridge, Mass., a voluntary association of Massachusetts Application July 12, 1950, Serial No. 173,440

6 Claims. (Cl. 88—20)

This invention relates to improvements in eye testing devices and has particular reference to improvements in eye testing devices of the type used primarily for determining and measuring discrepancies with respect to size and shape perception in a patient's eyes.

One of the principal objects of the invention is the provision of an eye testing instrument for determining and measuring differences of the size and shape of the ocular image of one of a patient's eyes relative to that of the other eye, which instrument is so constructed and arranged that the entire assembled device occupies a minimum of space in comparison with prior devices of this nature, with the operative parts thereof being controllable by simple and efficient means for efficiently and easily obtaining the desired determinations and measurements.

Another object is to provide an instrument of the above character having improved optical systems and adjustment control means therefor for optically introducing varying degrees of size and shape magnification with substantially no ultimate change in focus.

Another object is to provide improved means for controlling the adjustment of said optical systems whereby selected elements of each optical system, before the respective eyes of a patient, may be simultaneously rotated substantially equal amounts in opposing directions for introducing an apparent change in the spacial relation of selected components of the target elements.

Another object is to provide test means for a device of the above character, comprising a pair of spaced charts each of which has spaced upright reference lines and two diagonally related cross lines, said optical systems being adjustable to effect a visual change in stereopsis as visually indicated by the upright reference lines, and further being adjustable for effecting a change in the visual plane of the test means as visually indicated by said cross lines.

Other objects and advantages of the invention will become apparent from the following description taken in connection with the accompanying drawings, in which:

Fig. 5 is a fragmentary sectional view taken substantially through the center of the device longitudinally thereof;

Fig. 6 is a fragmentary sectional view taken on line 6—6 of Fig. 5 and looking in the direction of the arrows;

Fig. 7 is a fragmentary sectional view taken on line 7—7 of Fig. 5 and looking in the direction of the arrows;

Figs. 11 and 12 illustrate the shapes of the sight limiting apertures;

Fig. 13 is an enlarged fragmentary sectional view of the resilient shaft supporting means;

Fig. 14 is a diagrammatic illustration of the optical systems used in the device;

Fig. 15 is a sectional view taken on line 15—15 of Fig. 4 and looking in the direction of the arrows;

Referring more particularly to the drawings wherein like characters of reference designate like parts throughout the several views, numeral 20 refers to the hollow base portion of the device on which is positioned a removable cap or cover 21, with a flat plate 22 being screwed or otherwise attached to the lower end of the base portion 20 to completely enclose the mechanism.

Figure 8:
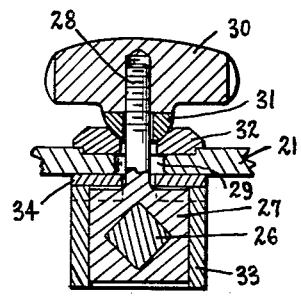
Fig. 8 is an enlarged fragmentary sectional view taken on line 8—8 of Fig. 5.

The forward portion of the cap 21 is provided with a pair of spaced openings 23 adjacent which the eyes of the patient are adapted to be positioned. To position the eyes in proper spaced relation with the openings 23, the patient's head is positioned against head rest pads 24 carried by one end of a curved arm 25, the other end of the arm 25 extending through an opening 26 into the interior of the device where it is secured to one end of a longitudinally extending bar 26 (Figs. 5 and 8). A block 27 has an opening therethrough shaped to slidably receive the bar 26 and has an upwardly extending threaded stem 28 thereon which extends through an opening 29 in the cap 21 and carries a knob 30. A washer 31 is located on the stem 28 adjacent the knob 30 and is provided with a convexly curved surface which is adapted to rest upon the similarly curved surface of a ringlike member 32 carried by the cap 21. The openings in the washer 31 and member 32 through which the stem 28 extends are both substantially larger than the diameter of the stem, as is the opening 29 in the cap, whereby the stem 28 is permitted to move freely therein. The block 27 is positioned within a cylindrical member 33 which is provided with an opening shaped to slidably receive the bar 26 and which is adapted to abut against a slidable block 34 positioned between the cylindrical member 33 and the inner surface of the cap 21. The lower surface of the slidable block 34 is provided with a concave shaped portion having a curvature of a radius substantially the same as the radius of the cylindrical member 33. Thus, when the knob 30 is loosened upon the stem 28, the arm 25 and bar 26 can be adjusted longitudinally of the instrument, up or down, or about the axis of the stem 28, as desired to properly position the patient's head and eyes. Then by tightening the knob 30, the stem 28 and block 27 are drawn upwardly, whereupon the block 27 will tighten the bar 26 within the cylindrical member 33 and the force exerted thereby will cause the cylindrical member 33 to become firmly and relatively immovably seated in the surface cavity of the slidable block 34. Thus, the device will remain in the desired adjusted position.

After the patient's eyes have been positioned at the desired distance from and in substantial alignment with the openings 23, the optical systems of the device, one complete system for each eye carried by a respective support 35, are adjusted toward and away from one another to position the said optical systems at the desired interpupillary distance and so that the patient will view substantially through the centers of the systems. The supports 35 are each provided with a platelike base portion 36 having depending portions 37, each of which having a bearing opening for slidably receiving the forward and rear supporting shafts 38 and 39 respectively. The ends of the rear shafts 39 are supported in bushings 40 (Fig. 6) carried by upwardly extending arms 41 formed on a base plate 42 which is secured to a semicircular lip 43 formed on the inside of the forward end of the hollow base 20 of the device. The shafts are retained in place by means such as set screws 44 or other suitable means.

To provide ease in manufacturing and assembling the device, the forward shaft 38 has its ends flattened (Fig. 13) to receive thereupon a respective flexible fulcrum plate 45. The fulcrum plates 45 are riveted or otherwise secured at one end to the shaft 38 and have their opposed ends located within notches 46 formed in the forward edge of the base plate 42 and held therein as by screws 47. Due to the flexibility of the fulcrum plates 45 the shaft 38 can be easily assembled even if the drilled holes therefor are slightly misaligned or the spacing between the forward holes and the holes for reception of the rear shafts 39 is no critically maintained. Thus, the supports 35 for the optical system are carried by the shafts 38 and 39 and can be slid on the shafts in a direction toward and away from each other, with shaft 39 thus serving as master guide for each support 35.

Figure 10:
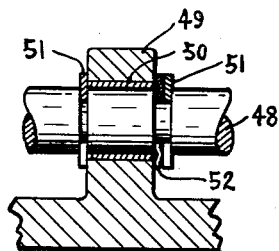
Fig. 10 is an enlarged fragmentary sectional view of the means for securing the optical system adjusting shafts.

The means for simultaneously moving the optical systems embodies a single shaft 48 having knobs 58 on the opposed ends thereof. The shaft extends transversely beneath the supports 38 and 39 (Figs. 5 and 6) and is rotatably carried by a centrally located upwardly extending arm 49 (Figs. 6 and 10) formed on the base plate 42. The shaft 48 is positioned within a bushing 50 in the arm 49 and is retained from longitudinal displacement by a pair of split washers 51, one located over the shaft 48 on each side of the arm 49 in circumferential grooves provided therefor in the shaft 48. A spring washer 52 is located on the shaft 48 between the arm 49 and one of the split washers 51 to take up slack in the connection.

Figure 9:
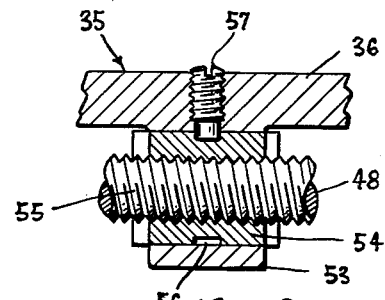
Fig. 9 is an enlarged fragmentary sectional view taken on line 9—9 of Fig. 5.

On the under side of the base portion 36 of each of the supports 35 and substantially centrally thereof is a downwardly extending lug 53, see Figures 6 and 9. The lugs 53 are provided with axially aligned openings therethrough in each of which is rotatably positioned an internally threaded drive bushing 54. The shaft 48 is positioned within the drive bushing 54 and is provided, in the area of engagement therewith, with threaded portions 55. The threaded portion 55 for engagement with one drive bushing 54, however, is provided with right-hand threads while the opposed threaded portion is provided with left-hand threads. The drive bushings 54 are each provided with a circumferential groove 56 and a set screw 57 inserted through the respective support 35 is adapted to engage the respective groove 56. The ends of the bushings 54 are also notched to permit insertion of a suitable tool for initially adjusting the bushings, after which the set screws 57 are tightened and thus render the bushings immovable.

Figure 2:
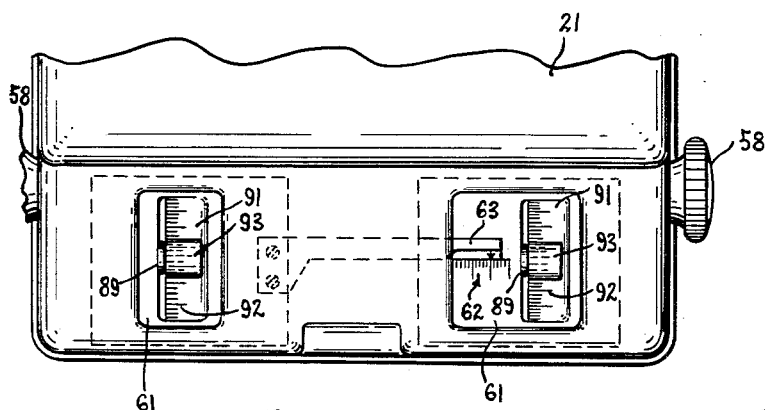
Fig. 2 is a top elevational view of the forward end of the device shown in Fig. 1.
Figure 3:
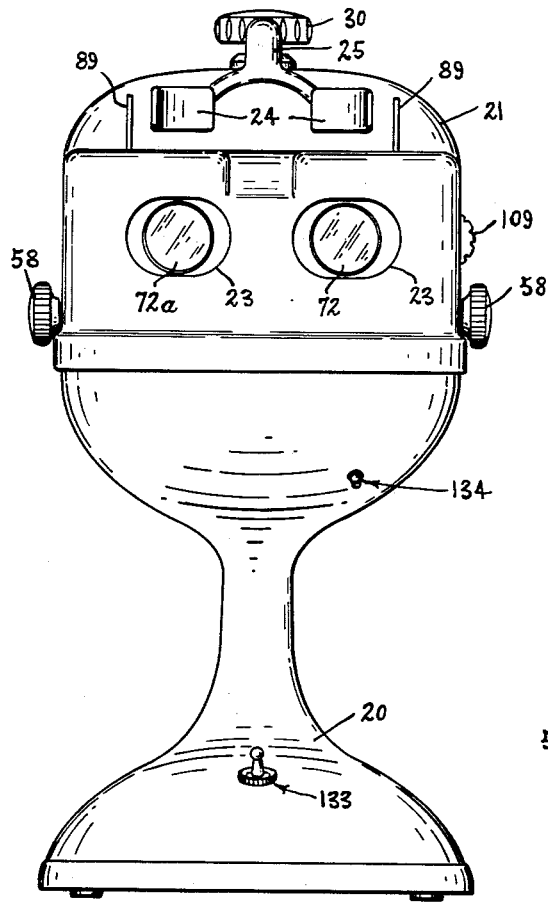
Fig. 3 is a front elevational view of the device shown in Fig. 1.

Thus, by manual rotation of either of the knobs 58 on the ends of the shaft 48, the supports 35 can be moved toward and away from each other to adjust the optical systems carried thereby to the desired interpupillary distance of the patient's eyes. For visually recording this adjustment there is provided an apertured angular plate 59 disposed over the front and top of each optical system (Figs. 5 and 15) and attached at the top to upright portions of the respective supports 35 as by screws 60. An indicator plate 61 (Fig. 2) is carried by each angular plate 59, one indicator plate 61 bearing a graduated scale 62 and the other carrying an indicator 63 having a reference mark thereon which is adapted to cooperate with the scale 62 to indicate the interpupillary distance adjustment.

It is to be understood that in being measured with the present device a patient will wear the equivalent of his prescription lenses in the form of trial lenses which are known to correct his vision for defects other than size and shape errors.

Figure 16:
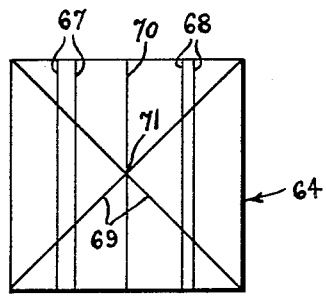
Fig. 16 is a front elevational view of one of the charts used in the device.
Figure 17:
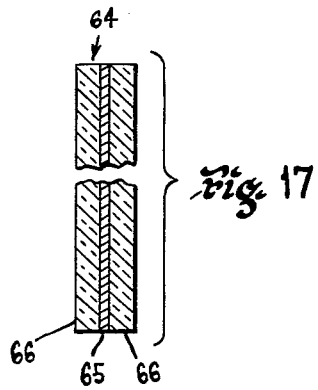
Fig. 17 is an enlarged sectional view of the chart shown in Fig. 14.

Following the interpupillary adjustment, the patient is requested to sight through the optical systems, that is he is made to view targets 64, one target for each eye (Figs. 5, 7, 16, 17 and 18), which are located within the instrument in alignment with the respective optical systems and which are each arranged to form a predetermined ocular image. The charts are preferably formed of transparent or translucent material such as a plastic film 65 (Fig. 17) laminated between two pieces of glass 66. The film 65 is provided with two pairs of spaced vertical lines 67 and 68 (Fig. 16), cross lines 69 extending from corner to corner, and a central vertical line 70 crossing the cross lines 69 at the intersection 71. The target for each of the right and left eyes vary only in that in the right eye target the vertical lines 68 are closer together than the vertical lines 67 while in the left eye target the opposite holds true.

Figure 18:
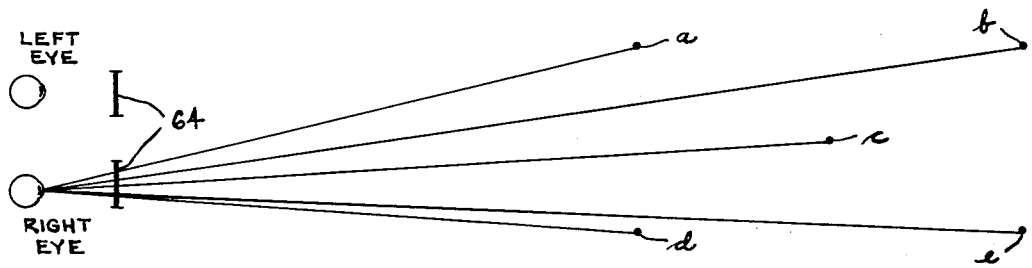
Fig. 18 is a diagrammatic illustration of the space configuration which a patient reconstructs binocularly in using the device.

The targets are so arranged that when viewed simultaneously they produce in effect a space image having components designated by the letters $a$, $b$, $c$, $d$ and $e$, in a visual arrangement such as indicated in Fig. 18. As indicated by the projection lines, the target lines 67 indicate the points $a$ and $b$, intersection line 70 point $c$, and lines 68 points $d$ and $e$. Thus, it will be seen that points $a$ and $d$ appear nearer to the observer than points $b$ and $e$, with the cross appearing as being therebetween.

The optical systems (Figs. 5 and 14) are designed according to the dimensional characteristics of the instrument, target distance, etc., to introduce the following optical characteristics.

Keeping in mind that the test target for the respective eyes, as set forth above, are so designed as to produce stereoscopically arranged elements in the form of four spaced vertical lines, two of which appear as being in a plane forwardly of the other of said spaced vertical lines and further having cross lines positioned therebetween.

The optical system for the right eye embodies adjustable components which in effect cause one or the other of said vertical lines in said respective planes to move forwardly or rearwardly of the other of said vertical lines. The optical system for the left eye introduces an effective rotation of the cross lines about a vertical axis passing through the point of intersection of said cross lines whereby the sides of said cross lines are effectively moved forwardly or rearwardly. The said optical systems each further embody lens elements which are simultaneously rotatable to introduce an effective rotation of the cross lines about a horizontal axis passing through the point of intersection of said cross lines whereby the top and bottom of the cross lines are effectively made to move forwardly or rearwardly about said axis. It is pointed out that each of said adjustments have little, if any, effect upon the other of said adjustments and that the extent of said respective adjustments are dependent upon the deviations of the eyes from the normal shape and size of test images for the respective eyes. It is further pointed out that said adjustments introduce little, if any, change in focus.

The above provides means whereby the full extent of the size and shape errors of a patient's eyes may be determined as will be described more fully hereinafter.

With the present instrument the said optical systems, as illustrated in Figs. 5 and 14, are each carried by the respective supports 35 and each include fixed plus 2.37 D. spherical lenses 72 and 72a located nearest the openings 23 for effectively producing images of the targets 64 at a location approximately three meters from the eye as compared to the true dimensional distance of 220 millimeters, fixed compensating approximately 5 per cent meridianal lenses 73 and 73a for placing the zero point as to magnification introduced by the adjustable lens units at the midpoint of the range of movement of said adjustable units whereby plus or minus magnification can be introduced by adjusting said lens units to one side or the other of said zero point, and third fixed minus 9.00 D. cylinder lenses 74 and 74a which comprise one component of the adjustable units and adjustable plus 9 D. cylinder lenses 76 and 76a which complete the major units. The above lenses 72 and 72a, 73 and 73a, 74 and 74a are all fixedly carried in alignment within an upright portion 75 of each support 35. The lenses 72 and 72a both have opposed spherical surfaces. The compensating lenses 73 and 73a are bent plane parallel cylinder lenses having their concave surfaces directed toward the patient and with the axis of the right eye lens 73 being horizontal and located at a ninety degree angle with respect to the axis of left eye lens 73a.

Lenses 74 and 74a are plano-minus cylinder lenses with the plano surfaces being directed toward the patient and with the cylinder axes being at right angles to one another, the axis of the right eye lens 74 being vertical and the left horizontal.

Figure 4:
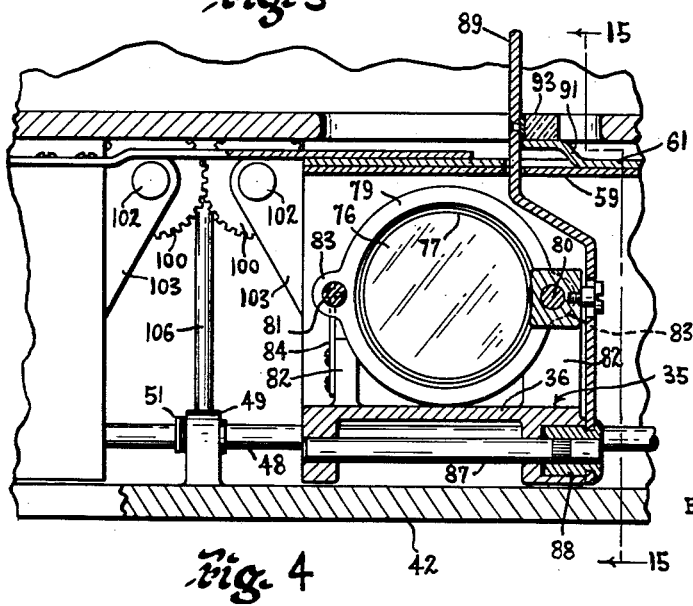
Fig. 4 is a fragmentary sectional view taken on line 4—4 of Fig. 1 and looking in the direction of the arrows.

The fourth lenses 76 and 76a are plano-plus cylinder lenses having their cylinder surfaces directed toward the patient and with their axes at right angles to each other and with the cylinder axis of the right eye lens 76 being vertical and the cylinder axis of the left eye lens 76a being horizontal. The lenses 76 and 76a are for varying the magnification in the respective meridians of the target image and are each independently adjustable toward and away from the respective components 74 and 74a. The lenses 76 and 76a are each mounted in an encircling ring 77 held as by set screws 78 in a circular holder 79 (Figs. 4 and 5) and are in turn adjustable longitudinally of the line of sight to introduce the above mentioned variations in magnification.

A pair of parallel spaced longitudinally extending guide rods 80 and 81 are supported by upwardly extending portions 82 of the supports 35 and freely extend through openings in lugs 83 formed on the opposed sides of the ring 79. Thus, the rings 79 and consequently the lenses 76 and 76a are each independently adjustable along the respective pairs of guide shafts 80 and 81. The shafts 81 are attached to the uprights 75 by means of fulcrum plates 84 similar to the previously described shaft 38 to provide greater ease in assembly. Fixedly connected to the lugs 83 on the outer sides of the rings 79 and adjustable therewith along the shafts 80 are slide blocks 85 each carrying a headed stud 86, Figs. 4 and 15.

The depending portions 37 of each of the supports 35 rotatably carry a shaft 87 to the outer end of which is fixedly attached a retainer 88. The outer end of each retainer 88 has a portion of reduced diameter over which one end of a vertically extending lever 89 is fitted, the extreme end of the retainer being headed over to prevent displacement of the lever 89. The levers 89 are each provided midway thereof with a longitudinal slot 90 through which extends a respective stud 86. The free ends of the levers 89 extend upwardly through openings in the plates 59 and 61 and cap 21. Thus, when they are manually moved toward and away from the patient, the lenses 76 and 76a will be consequently moved toward and away from the components 74 and 74a.

The portions 91 of the indicator plates 61 adjacent the levers 89 are raised slightly (Figs. 2 and 15) and are provided with a graduated scale 92. The levers 89 each carry a small transparent magnifier 93 which is provided with a hairline, arrow, or other suitable indicator mark whereby the adjustment of the lenses 76 and 76a can be determined by the position of the indicator mark relative to the scale.

The right lever 89, when moved, will cause movement of the lens 76 toward and away from the component 74. The lens 76 and component 74 have their cylinder curved surfaces directed toward one another, the axes of the cylinder curves being vertical. Thus, adjustment of the lens 76 will cause the target lines 67 or points a and b, Fig. 16 and 18, to appear to move toward and away from the patient, with respect to lines 68 or points d and e and will also cause an apparent rotation of the cross 69 about the central vertical line 70 or point c, depending upon the direction of movement of the lever 89, and thus visibly altering the relation of said target lines.

Movement of the left lever 89 will cause movement of lens 76a toward and away from the component 74a. Since the cylinder axes of the lens 76a and component 74 are horizontal, such movement will cause the target cross lines 69 to appear to rotate about a central vertical line 70 or point c.

Located between the lenses 76—76a and the respective targets are a pair of bent plane parallel 3 per cent meridianal "declination" lenses 94 and 94a, one for each optical system, the cylinder axis of each being normally vertical. Each lens 94 and 94a is supported upon a rearward extension 95 of a respective support 35 by means of an apertured housing 96, the lenses being located in the apertures thereof. Encircling each lens 94 and 94a is a ringlike member 97 having a ring gear wheel 98 secured to its rear surface. A retaining ring 99 (Fig. 5) is secured to the front surface of the member 97 and has a portion overlying the front surface of the housing 96 adjacent the aperture for preventing rearward displacement of the lens.

A pair of small gear wheels 100 are disposed between the gear wheels 98 and in mesh therewith and are held constantly in mesh with one another by means of a connecting plate 101 to which the gear wheels 100 are rotatably connected adjacent each end thereof by studs 102. The gear wheels 100 are held constantly in mesh with the respective gear wheels 98 by means of connecting plates 103 which are shaped at one end to have ringlike portions 104 (Fig. 5) encircling shoulders 105 formed on the housings 96 around the apertures, the plates 103 being rotatable on the shoulders 105 between the rear surfaces of the housings 96 and the gear wheels 98. The other ends of the plates 103 are connected to the ends of the studs 102 which carry the small gear wheels 100.

With this construction, as the supports 35 are moved toward and away from one another in adjusting the spacing between the optical systems to the desired interpupillary distance, the lenses 94 and 94a will move toward and away from each other and as they do so the small gear wheels 100, which constantly engage the large gear wheels 98 at points above the centers of the lenses 94 and 94a, will rise and fall accordingly and will remain in meshed relation with gear wheels 98 with the lenses 94 and 94a being retained in their initial axial positions. To guide them in this vertical movement there is provided a vertical guide shaft 106 which has its upper end fixedly connected, as by spot welding or other means, to the connecting plate 101. The lower end of the guide shaft 106 is free to move vertically within an opening 107 in a boss 108 formed on the base plate 42. The opening 107 extends through the base plate 42 and boss 108 to permit extensive vertical movement of the guide shaft 106 while limiting movement thereof in other directions.

Figure 1:
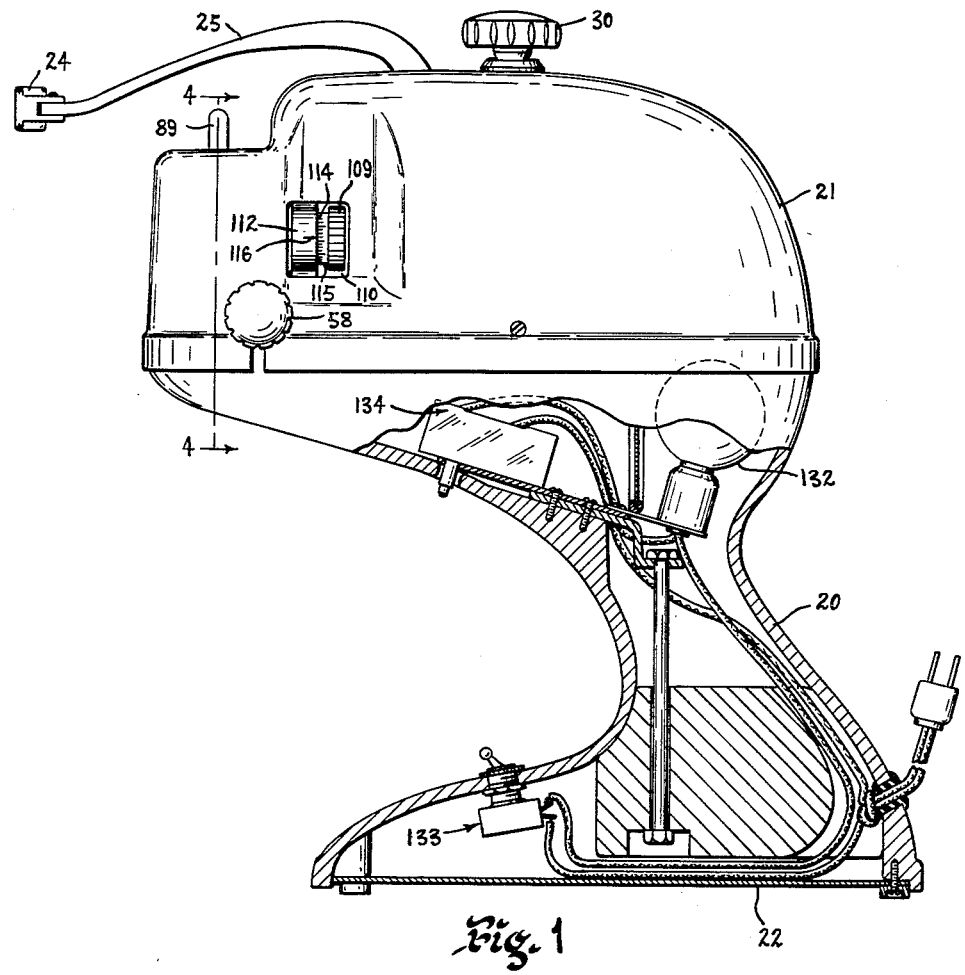
Fig. 1 is a side elevational view partly in section of a device embodying the invention.

A manually operated knob 109 (Fig. 1) is located at one side of the instrument in an opening 110 in the cap 21 and is connected to one end of a short shaft 111 (Fig. 6) which has its other end rotatably mounted in an outwardly projecting side portion 112 of one of the housings 96. A gear wheel 113 carried by the shaft 111 is constantly maintained in mesh with the adjacent gear wheel 98 whereby when the knob 109 is manually rotated the gear wheels 98 and 100 will cause the lenses 94 and 94a to be simultaneously rotated substantially equal amounts in opposite directions about their axes regardless of the pupillary adjustment.

The purpose of rotating the lenses 94 and 94a is to measure the oblique meridianal size error of the patient, as will be more clearly explained hereinafter, and the amount of rotation is visually recorded by means of a scale 114 which is provided on an adjustable collar 115 secured to the shaft 111 adjacent the knob 109, and an index mark 116 on the protruding portion 112 of the housing 96.

A cover plate 117 encloses the rear end of each housing 96 and is provided with an aperture 118 through which the respective target 64 is viewed by the patient. The apertures 118 in each of the cover plates are, however, of different shapes as indicated in Figs. 11 and 12 whereby they will present dissimilar configurations and will thereby prevent fusion of the peripheries of the apertures.

An elongated boxlike housing 119 is attached at one end by suitable angled means 120 to each of the cover plates 117 over the apertures 118 and carry the targets 64 at their opposed ends. A plate-like holder 121 has secured to the rear side thereof a pair of horizontally channeled members 122. The tragets 64 are positioned with their upper and lower edges in the channels in the members 122 and the holders 121 are apertured so that the targets 64 can be seen by the patient throuhg the optical systems and through the apertures 118 with said apertures 118 with said apertures producing the visible peripheries of the targets. The holders 121 are positioned against the rear end of the boxlike housings 119, the lower edges of each of the holders 121 being provided with a curved recess 123 near one end thereof, which is adapted to be positioned over the central portion of a button 124 carried by an angled member attached to the end of the adjacent housing 119. This aligns the targets horizontally with respect to the optical systems. A notch having a flat portion 125 adjacent the other end of each of the holders rests in a similar manner upon a second button 126 to assist in vertically aligning the target. Thus, the targets are always maintained in alignment with the respective optical systems. Spring clips 127 attached to the top of each housing 119 engage the top of the target holders 121 to securely hold them in positions on the ends of the housings 119.

Rearwardly of the targets 64 are a pair of upper and lower plates 128 and 129 respectively, the upper plate 128 being positioned within an inner peripheral slot in a rubber gasket 130 carried by the cap 21 and the lower plate 129 is similarly supported in the hollow base 20. When the cap 21 is assembled with the base 20, the plates 128 and 129 overlap at their adjoining edges and thereby provide an efficient light seal to prevent undesired general illumination of the interior of the device. However, to provide illumination of the targets 64, the upper plate 128 is provided adjacent each target 64 with a window 131 preferably of translucent material whereby illumination from a lamp 132 in the base 20 will be directed as desired upon the targets from the rear thereof. A switch 133 carried by the base is positioned in the lamp circuit for turning the lamp 132 on and off. However, to easily and quickly provide noiseless means for temporarily shutting off the lamp 132 during the testing of a patient's vision a normally closed micro-switch 134 is also mounted in the base 20 in said lamp circuit.

In operating the device, after the headrest and interpupillary distance adjustments have been made, the left eye lever 89 is positioned so that the left adjustable lens 76a is at substantially "zero" position, that is no net plus or minus magnification is introduced in the left eye optical system. The declinations lenses 94 and 94a are also adjusted to zero position. The right eye lever 89 is also moved to zero position. The right eye lever 89 is then moved to determine sensitivity of the patient's eyes, and is finally left in the position at which the patient states the vertical lines corresponding to points a and d appear to be equidistant from the patient. A reading of the position of the lens 76 is then taken, after which the left lever 89 is moved to adjust the lens 76a to a position where the patient states that the right side of the cross lines 69 appear to be equidistant to the left side of the cross, that is, there appears to be no rotation of the cross around the central vertical line 70. After a reading is taken of the position of the left lens 76a, the knob 109 is manipulated to cause simultaneous rotation in opposite directions of the declination lenses 94 and 94a as described hereinbefore to a point where the top of the cross lines appears to the patient to be equidistant to the bottom of the cross lines. This will cause the cross lines 69 to appear to move about an imaginary horizontal line through the center of the cross.

After the various adjustments have been made whereby the patient claims that the target lines appear to reconstruct the field as diagrammatically illustrated in Fig. 18, the readings on the various scales will indicate the size and shape errors of the patient's eyes, if any.

It is to be understood that during the various adjustments the lamp 133 may be shut off temporarily to prevent the patient from following the movements of the lines as the examiner makes changes therein. In this way accurate test results will be obtained.

From the foregoing it will be seen that simple, efficient and economical means have been provided for accomplishing all of the objects and advantages of the invention. While the novel features of the invention have been described and are pointed out in the annexed claims, it will be understood that many changes may be made in the details of construction shown and described without departing from the spirit of the invention. I, therefore, do not wish to be limited to the exact details shown and described as the preferred only are set forth by way of illustration.

I claim:

1. An eye testing device of the character described comprising a casing having a pair of spaced sight openings in the forward side thereof, a pair of lens supports mounted in said casing one adjacent each sight opening, and a pair of optical systems one secured to each of said supports and each disposed in substantially axial alignment with a respective one of said sight openings, said casing further containing illuminating means and a pair of elongated closed target carrying compartments, each of said compartments being attached to a respective lens support and having openings of restricted area in the front and rear walls thereof, the opening in the front wall of the compartments being visually aligned with the respective optical system on said lens support, and means restricting the passage of light from the illuminating means to the sight openings except through said openings in the rear walls of the two compartments, and translucent chart means overlying each of said openings in the rear wall of said compartments and illuminated by light passing through said opening from the illuminating means, said chart means each having an individual target, said targets being arranged in offset relation with respect to each other to provide a stereoscopic image, when both chart means are simultaneously viewed by the respective eyes of an observer, embodying a plurality of target components effectively located in spaced planes, and said pair of optical systems carried by the supports each embodying lens elements substantially aligned with said sight opening, each having their surface curvatures related to each other to introduce magnification of the target portions of the chart means viewed through said optical system in one meridian while substantially unaffecting magnification of said target portions in a meridian normal thereto, said lens elements in one system introducing magnification only in the horizontal meridian and in the other system only in the vertical meridian, at least one of said lens elements of each optical system being mounted on the support for axial adjustment toward and away from the other of said lens elements, and externally located control means extending through an opening provided in the casing and operatively connected with said adjustable lens elements of each optical system to change the spacing of said lens elements and consequent magnification of the image in said meridians.

2. An eye testing device of the character described comprising a casing having a pair of spaced sight openings in the forward side thereof, a supporting plate fixed to said casing and disposed in a substantially horizontal plane, a pair of spaced substantially parallel guide members extending in a direction approximately normal to the axis of said sight openings, one of said guide members being fixed to the supporting plate by relatively rigid supports and the other guide member by relatively flexible supports, a pair of lens supports slidably mounted on said spaced guide members for movement toward and away from each other, and a pair of optical systems one secured to each of said supports and each disposed in substantial alignment with a respective one of said sight openings, said casing further containing a pair of elongated closed target carrying compartments, each attached to a respective one of said lens supports and each having openings of restricted area in the front and rear walls thereof, the opening in the front wall of the compartments being substantially axially aligned with the respective optical system on said lens support, and means restricting the passage of light to the sight openings except through said openings in the rear walls of the two compartments, and translucent chart means overlying each of said openings in the rear wall of said compartments so as to be illuminated by light passing through said opening, said chart means each having an individual target, said targets being arranged in offset relation with respect to each other to provide a stereoscopic image, when both chart means are simultaneously viewed by the respective eyes of an observer, and said pair of optical systems carried by the supports each including lens means having surface curvatures controlled to effectively project said target image produced at a predetermined distance from the sight opening, and externally located means for adjusting said lens supports on said guide members to space said optical systems carried thereby at a desired pupillary distance apart.

3. An eye testing device of the character described comprising a casing having a pair of spaced sight openings in the forward side thereof, a pair of spaced substantially parallel guide members extending in a horizontal direction approximately normal to the axis of said sight openings and a pair of lens supports slidably mounted on said spaced guide members for movement toward and away from each other, a pair of optical systems one secured to each of said supports and each disposed in substantial alignment with a respective one of said sight openings, said casing further containing a pair of elongated closed target carrying compartments, each attached to a respective one of said lens supports and each having openings of restricted area in the front and rear walls thereof, the opening in the front wall of the compartments being substantially axially aligned with the respective optical system on said lens support, and means restricting the passage of light to the sight openings except through said openings in the rear walls of the two compartments, and translucent chart means overlying each of said openings in the rear wall of said compartments so as to be illuminated by light passing through said opening, said chart means each having an individual target, said targets being arranged in offset relation with respect to each other to provide a stereoscopic image, when both chart means are simultaneously viewed by the respective eyes of an observer, and said pair of optical systems carried by the supports each including lens means having surface curvatures controlled to effectively project said target image produced at a predetermined distance from the sight opening, and means for adjusting said lens supports on said guide members to space said optical systems carried thereby at a desired pupillary distance apart, said means including a rod extending transversely of the sight openings and through the wall of the casing and terminating in manually manipulatable means located externally of the casing, said rod having right hand and left hand threaded portions each threadedly connected with a bushing rotatable in a respective one of said lens supports, said bushings each having a circumferential external slot therein and said lens supports each having means engaging in said slots and adapted to retain said bushing in a fixed non-rotatable connection therewith when the supports have been positioned in proper spaced relation to the mid point between the two sight openings.

4. An eye testing device of the character described comprising a casing having a pair of spaced sight openings in the forward side thereof, a pair of lens supports mounted in said casing one adjacent each sight opening, and movable in directions toward and away from each other transversely of the sight openings, and a pair of optical systems one secured to each of said supports and each disposed in approximate alignment with a respective one of said sight openings, said casing further containing illuminating means and a pair of elongated closed target carrying compartments, each of said compartments being attached to a respective lens support and having openings of restricted area in the front and rear walls thereof, the opening in the front wall of the compartments being substantially axially aligned with the respective optical system on said lens support, and means restricting the passage of light from the illuminating means to the sight openings except through said openings in the rear walls of the two compartments, and translucent chart means overlying each of said openings in the rear wall of said compartments and illuminated by light passing through said opening from the illuminating means, said chart means each having an individual target, said targets being arranged in offset relation with respect to each other to provide a stereoscopic image, when both chart means are simultaneously viewed by the respective eyes of an observer, embodying a plurality of components effectively located in spaced planes, and said pair of optical systems carried by the supports each embodying a first lens component having surface curvatures controlled to effectively project said image produced at a predetermined distance from the sight opening, said optical systems each further including second and third lens elements axially aligned with said first lens component, each having their surface curvatures related to each other to introduce magnification of the target portions of the chart means viewed through said optical system in one meridian while substantially unaffecting magnification of said target portions in a meridian normal thereto, said second and third lens elements in one system introducing magnification only in the horizontal meridian and in the other system only in the vertical meridian, one of said two last mentioned lens elements of each optical system being fixed on the support and the other being mounted on the support for adjustment toward and away from the fixed lens element, and said casing further having a pair of openings in the top wall thereof, a plate carried by each of said lens supports and visible in one of said openings, lever means carried by each of said lens supports and extending through an opening provided in a respective one of said plate, said lever means being operatively connected with said adjustable lens element of the optical system carried by the respective lens support to change the spacing of said second and third lens elements thereof, and scale and indicia means carried by said lever and plate for indicating the consequent magnification of the image in said meridian by said optical system, one of said plates further carrying a member having an end portion overlying the other plate, said end portion and other plate having scale and indicating means to indicate the spacing of the two optical systems carried by the lens supports relative to each other.

5. An eye testing device of the character described comprising a casing having a pair of spaced sight openings in the forward side thereof, a pair of lens supports mounted in said casing one adjacent each sight opening, and a pair of optical systems one secured to each of said supports and each disposed in substantially axial alignment with a respective one of said sight openings, said casing further containing a pair of elongated closed target carrying compartments, each of said compartments being attached to a respective lens support and having openings of restricted area in the front and rear walls thereof, the opening in the front wall of the compartments being substantially axially aligned with the respective optical system on said lens support, and means restricting any passage of light to the sight openings except through said openings in the rear walls of the two compartments, and translucent chart means overlying each of said openings in the rear wall of said compartments and illuminated by light passing through said opening, said chart means each having an individual target, said targets being arranged in offset relation with respect to each other to provide a stereoscopic image, when both chart means are simultaneously viewed by the respective eyes of an observer, embodying a plurality of target components effectively located in spaced planes, and said pair of optical systems carried by the supports each embodying a first plus spherical lens component having surface curvatures controlled to effectively project said space image produced at a predetermined distance from the sight opening, said optical systems each further including second and third lens elements axially aligned with said first lens component, one embodying a plano-minus cylinder lens and the other a plano-plus cylinder lens and having their cylinder surfaces directed toward each other with the cylinder axis of the said second and third lens elements of one optical system being approximately parallel with each other and at approximately right angles to the cylinder axis of the second and third lens elements of the other optical system, said second and third lens elements in one system introducing magnification of the target portions of the chart means viewed through said optical system only in the horizontal meridian and in the other system only in the vertical meridian, one of said two last mentioned lens elements of each optical system being fixed on the support and the other being mounted on the support for axial adjustment toward and away from the fixed lens element to vary the magnification value of said second and third lens elements of each optical system, and a further lens in each of said optical systems comprising bent plane parallel cylinder lenses having their concave surfaces directed toward the respective sight openings with which they are aligned and with their cylinder axis approximately at right angles to the cylinder axis of the second and third lens elements of the optical system in which they are contained, said further lens placing the zero point of magnification produced by the second and third lens elements of the respective optical system at the mid point of the range of adjustment of the adjustable one of said second and third lens elements, and externally located means extending through an opening provided in the casing and operatively connected with said adjustable lens element of each optical system to change the relative spacing of said second and third lens elements and consequent magnification of the image in said meridians, together with scale and indicator means associated with said externally located means for indicating the extent of magnification produced by each optical system.

6. An eye testing device of the character described comprising a casing having a pair of spaced sight openings in the forward side thereof, a pair of lens supports mounted in said casing one adjacent each sight opening, and a pair of optical systems one secured to each of said supports and each disposed in substantially axial alignment with a respective one of said sight openings, said casing further containing a pair of elongated closed target carrying compartments, each of said compartments being attached to a respective lens support and having openings of restricted area in the front and rear walls thereof, the opening in the front wall of the compartments being substantially axially aligned with the respective optical system on said lens support, and means restricting any passage of light to the sight openings except through said openings in the rear walls of the two compartments, and translucent chart means overlying each of said openings in the rear wall of said compartments and illuminated by light passing through said opening, said chart means each having an individual target, said targets being arranged in offset relation with respect to each other to provide a stereoscopic image, when both chart means are simultaneously viewed by the respective eyes of an observer, embodying a plurality of vertical target lines effectively located by pairs in spaced parallel planes and an intermediately disposed target cross parallel thereto, and said pair of optical systems carried by the supports each embodying a first plus spherical lens component having surface curvatures controlled to effectively project said space image produced at a predetermined distance from the sight opening, said optical systems each further including second and third lens elements axially aligned with said first lens component, one embodying a plano-minus cylinder lens and the other a plano-plus cylinder lens and having their cylinder surfaces directed toward each other with the cylinder axis of the said second and third lens elements of one optical system being approximately parallel with each other and at approximately right angles to the cylinder axis of the second and third lens elements of the other optical system, said second and third lens elements in one system introducing magnification of the target portions of the chart means viewed through said optical system only in the horizontal meridian and in the other system only in the vertical meridian, one of said two last mentioned lens elements of each optical system being fixed on the support and the other being mounted on the support for axial adjustment toward and away from the fixed lens element to vary the magnification value of said second and third lens elements of each optical system and effectively rotate the target cross about a first axis intersecting its center, a pair of bent plane parallel cylinder lenses in each of said optical systems each having its concave surface directed toward the respective sight opening with which its optical system is aligned, the first bent plane parallel cylinder lens having its cylinder axis approximately at right angles to the cylinder axis of the second and third lens elements of said optical system in which it is contained, said lens placing the zero point of magnification produced by the second and third lens elements of the respective optical system at the mid point of the range of adjustment of the adjustable one of said second and third lens elements, and the other bent plane parallel cylinder lenses having its cylinder axis approximately normal to that of said first lens and adapted to be rotated simultaneously in equal amounts one clockwise and the other counterclockwise, to effectively rotate the target cross about a second axis intersecting and substantially normal to said first mentioned axis about which the target cross is effectively rotated, and externally located means operatively connected with said adjustable lens element of each optical system and said rotatable lenses whereby the extent of effective rotation of said target cross may be controlled by the operator of the device.

(References on following page)

References Cited in the file of this patent

UNITED STATES PATENTS

| | | |
|---|---|---|
| 2,095,235 | Ames | Oct. 12, 1937 |
| 2,107,305 | Ogle | Feb. 8, 1938 |
| 2,179,850 | Glancy | Nov. 14, 1939 |
| 2,230,993 | Ames, Jr., et al. | Feb. 11, 1941 |
| 2,391,248 | Koch | Dec. 18, 1945 |
| 2,419,939 | Ames | May 6, 1947 |
| 2,481,582 | Ellis | Sept. 13, 1949 |
| 2,603,124 | Richards | July 15, 1952 |